Patented July 10, 1951

2,560,055

UNITED STATES PATENT OFFICE 2,560,055

SMOOTH-GRIP FRICTION CLEANSER

Robert W. Westfall, Sunland, and Robert E. Lenihan, Los Angeles, Calif.

No Drawing. Application November 7, 1949,
Serial No. 126,048

4 Claims. (Cl. 252—89)

This invention has to do with substances used for renewing or reconditioning friction mediums such as those of the woven or block type used in construction equipment and the like having positive friction drive or brake surfaces.

It is well known that in many fields, particularly the construction field, the block type and woven friction bands of friction drive machines are adversely affected by the elements, especially during periods when the machines are idle. During periods of use these friction surfaces are also adversely affected by dirt and oil and lubricants which often find their way onto the surfaces. The surfaces are also often damaged and become glazed through overheating. As a result, the surfaces may slip or grab when used, depending upon the condition of the friction surfaces and this is a dangerous factor in the operation of such equipment.

Various substances have been used in an attempt to recondition or clean the friction surfaces, but so far as we are aware, no substances have been found or used which are entirely satisfactory. Some substances are helpful but incomplete in their action, while others are injurious to either the friction surfaces or the metal drums and other parts of the friction mechanisms.

It therefore is an object of this invention to provide a novel compound or composition for cleansing and reconditioning friction surfaces such as woven brake bands, blocks, and the like, which is efficient in its action and which is safe to use, having no harmful effects on either the friction surfaces or the metal parts of the friction drives or brakes.

Another object is to provide a composition for the purpose indicated which is easy to use and which may be used by inexperienced persons since it will do no harm if an excess quantity is applied.

Still another object of the invention is to provide a composition of the type indicated which may be used to treat friction surfaces which have been impaired for use from one or more of several different causes. These and other objects will be apparent from the following description.

More particularly describing the invention, we have found that an excellent composition for treating friction surfaces can be made by combining wood ash, fuller's earth, and rosin. We preferably employ hardwood ash, such as the ash of hickory or oak, and this should make up from about 40% to 60% of the whole by weight. The fuller's earth should make up from about 35% to 50% of the whole and the rosin should be present in an amount equal to about 1% to 10% of the entire composition. We also find it desirable to add from ½% to 5% of red oxide, although this is not absolutely essential for all purposes. The ingredients in finely divided form are thoroughly mixed to produce a relatively homogeneous product.

While the proportions of the ingredients may be varied within the limits noted above and these limits are not absolutely critical, we have found that a composition in which the ingredients are present in approximately the following proportions by weight gives excellent results:

| | Parts |
|---|---|
| Hardwood ash | 50 |
| Fuller's earth | 45 |
| Rosin | 5 |

A small amount of red oxide within the range noted above may be added. By red oxide we mean the commercially available product which contains about 85% iron oxide.

We have found that the composition as above outlined is useful in treating brake or friction surfaces which may have been damaged by one or a variety of causes and that the combination of substances is required in order to obtain a composition which will successfully treat the various conditions encountered in the field. The ingredients cooperate in such a manner that together they act as a cleanser and reconditioner of the surfaces, rendering the same smooth-acting and relatively quiet.

We claim:

1. A composition for use in reconditioning friction surfaces and the like consisting essentially of, by weight, from 40 to 60 parts hardwood ash, from 35 to 55 parts fuller's earth, and from 1 to 10 parts powdered rosin.

2. A composition as set forth in claim 3 and also including from ½ to 5 parts red oxide.

3. A composition for use in reconditioning friction surfaces and the like consisting essentially of, by weight, about 50 parts hardwood ash, about 45 parts fuller's earth, and about 5 parts rosin.

4. A composition for use in reconditioning friction surfaces and the like consisting essentially of, by weight, about 50 parts hardwood ash, about 45 parts fuller's earth, about 5 parts rosin, and from ½ to 5 parts red oxide.

ROBERT W. WESTFALL.
ROBERT E. LENIHAN.

REFERENCES CITED

The following references are of record in the file of this patent:

UNITED STATES PATENTS

| Number | Name | Date |
| --- | --- | --- |
| 126,409 | Musgrave et al. | May 7, 1872 |
| 151,837 | Butterfield | June 9, 1874 |
| 1,560,659 | Burket | Nov. 10, 1925 |
| 2,120,442 | Lindinburg | June 14, 1938 |

FOREIGN PATENTS

| Number | Country | Date |
| --- | --- | --- |
| 101,477 | Australia | June 25, 1937 |